(12) United States Patent
Anderson et al.

(10) Patent No.: US 6,681,010 B1
(45) Date of Patent: Jan. 20, 2004

(54) METHODS, SYSTEMS AND COMPUTER PROGRAM PRODUCTS FOR AUTOMATIC TASK DISTRIBUTION

(75) Inventors: David H. Anderson, Hillsborough, NC (US); Martin C. Buskirk, Raleigh, NC (US); Giuseppe DiAdamo, Ontario (CA); Shelley St. Phillips Germain, Apex, NC (US); Scott Charles Lamb, Fuquay Varina, NC (US); Richard J. Madrid, Raleigh, NC (US); Danilo P. Servilla, Ontario (CA)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

(21) Appl. No.: 09/144,660

(22) Filed: Sep. 1, 1998

(51) Int. Cl.[7] .................................. H04M 3/00
(52) U.S. Cl. ........................ 379/265.11; 379/265.02; 379/265.09; 379/265.13
(58) Field of Search ................... 379/258, 265, 379/265.01, 265.02, 265.03, 265.04, 265.05, 265.09, 265.11, 265.13, 266.01, 266.02, 267

(56) References Cited

U.S. PATENT DOCUMENTS

| | | |
|---|---|---|
| 5,206,903 A | 4/1993 | Kohler et al. ............... 379/309 |
| 5,604,907 A | 2/1997 | Conner et al. ............... 395/683 |
| 5,608,786 A | 3/1997 | Gordon ....................... 379/100 |
| 5,623,657 A | 4/1997 | Conner et al. ............... 395/368 |
| 5,634,095 A | 5/1997 | Wang et al. ................. 395/326 |
| 5,642,511 A | 6/1997 | Chow et al. ................. 395/701 |
| 5,659,692 A | 8/1997 | Poggio et al. .............. 395/330 |
| 5,664,115 A | 9/1997 | Fraser ......................... 705/37 |
| 5,684,872 A | 11/1997 | Flockhart et al. ........... 379/266 |
| 5,848,143 A * | 12/1998 | Andrews et al. ............ 379/219 |
| 5,999,965 A * | 12/1999 | Kelly .......................... 709/202 |
| 6,038,302 A * | 3/2000 | Burok et al. ............. 379/201.01 |
| 6,058,435 A * | 5/2000 | Sassin et al. ........... 379/265.12 |
| 6,094,479 A * | 7/2000 | Lindeberg et al. .......... 379/219 |
| 6,185,565 B1 * | 2/2001 | Meubus et al. ............... 707/10 |
| 6,449,356 B1 * | 9/2002 | Dezonno ............... 379/265.09 |

* cited by examiner

*Primary Examiner*—Fan Tsang
*Assistant Examiner*—Ovidio Escalante
(74) *Attorney, Agent, or Firm*—Donald R. Boys; Central Coast Patent Agency, Inc.

(57) ABSTRACT

Methods, systems and computer program products are provided which automatically distribute tasks associated with a telephone system and tasks associated with a computer system between a plurality of agents tracking ACD telephone status of the plurality of agents and tracking computer status of the plurality of agents. When a request for a computer task is received, an agent of the plurality of agents is assigned to the computer task corresponding to the received request based on the ACD telephone status and the computer status of the agent of the plurality of agents.

3 Claims, 4 Drawing Sheets

METHODS, SYSTEMS AND COMPUTER PROGRAM PRODUCTS FOR AUTOMATIC TASK DISTRIBUTION

FIELD OF THE INVENTION

The present invention relates generally to task distribution and more particularly to automatic task distribution to agents.

BACKGROUND OF THE INVENTION

With the increase in use of the Internet, there has also been an increase in the availability of support for products or services and the opportunity to conduct business over the Internet. Typically, these services are provided by e-mail, chat sessions, voice over IP (Internet Protocol) or other electronic means of communication. Furthermore, these services are often provided by the same individuals that provide conventional telephone services. Thus, the same individual may be responsible for answering e-mail questions and for answering questions over the telephone.

In a conventional telephone system, users will often log onto a telephone switch device with automatic call distribution (ACD). Such a telephone switch device would be provided with characteristics of the user logged on and then match those characteristics with characteristics of incoming calls so that a user with the correct qualifications or expertise answers the incoming call. For example, a caller may be provided with several options from a voice menu and when the option is selected the call is routed to a user associated with the selected option.

Despite the fact that the individual answering telephone calls and e-mail or other electronic messages may be the same individual, currently, there are limited mechanisms for coordinating these tasks such that when an individual is answering an e-mail they do not receive telephone calls or other similar situations. Currently, to avoid these situations, users may need to take manual actions to log off the telephone switch or make themselves unavailable, in order to not receive telephone calls.

In light of the above discussion a need exists for improvement in the assignment of tasks across various message media.

SUMMARY OF THE INVENTION

In view of the above discussion, it is an object of the present invention to provide automatic task distribution including distribution of telephone and computer related tasks.

It is another object of the present invention to facilitate the coordination of telephone and computer related tasks.

It is another object of the present invention to use existing telephone equipment in the coordination of telephone and computer related tasks.

These and other objects of the present invention are provided by methods, systems and computer program products which automatically distribute tasks associated with a telephone system and tasks associated with a computer system between a plurality of agents tracking ACD and telephone status of the plurality of agents and tracking computer status of the plurality of agents. When a request for a computer task is received, an agent of the plurality of agents is assigned to the computer task based on the ACD status, telephone status and the computer status of the agent of the plurality of agents.

In a further embodiment, when a request for a telephone task is received an agent of the plurality of agents is assigned based on the ACD status, telephone status and the computer status of the agent of the plurality of agents. Such a telephone task may be an incoming telephone call.

By tracking the ACD status, telephone status and the computer status of an agent, telephone tasks and computer tasks may be coordinated such that agents occupied by telephone tasks will not be assigned computer tasks and agents occupied by computer tasks will not be assigned telephone tasks. Thus, the present invention allows for automatic distribution of both computer and telephone tasks. Furthermore, this distribution is coordinated to reduce the likelihood of interference between the two types of tasks.

In a further embodiment of the present invention, the ACD status, telephone status and the computer status of the assigned agent are updated to indicate that the agent is unavailable. Furthermore, the ACD status and telephone status may be tracked by maintaining a list of the status of agents of the plurality of agents which are logged onto a telephone switch with automatic call distribution (ACD), wherein the list of status of agents corresponds to the status of the agent with respect to the telephone switch. Information about the call queue associated with the telephone switch may also be maintained. Tracking computer status may be accomplished by maintaining a list of the status of agents of the plurality of agents which are logged onto a virtual ACD, wherein the list of status of agents corresponds to whether the agent is currently assigned at least one of a computer task and a telephone task. Also, a copy of a computer task request queue associated with the virtual ACD may be maintained.

A virtual ACD system, as referenced above, preferably includes one or more request queues. The agents may log on to one or more of these queues which corresponds to the capabilities or skill they possess.

By utilizing tracking, the status of a switch with ACD capabilities (a conventional ACD) switch may be utilized. Thus, the present invention may be utilized with existing ACD telephone systems which allow for communication and tracking of the switch status.

In still another embodiment of the present invention, each agent has associated with it agent characteristics. In such a case, a computer task request is received which has associated with it characteristics which are to be associated with an agent to be assigned to the requested computer task. A list of available agents from the plurality of agents is generated and an agent is selected from the list of available agents having agent characteristics that correspond to the characteristics associated with the received request. The received computer task request is then assigned to the selected agent.

The status of the agent may be updated by requesting that a telephone switch having an ACD make the selected agent unavailable. The list of the status corresponding to the status of the agents logged into the telephone switch is then updated when the telephone switch indicates that the agent is unavailable. The list of the status of agents of the plurality of agents which are logged onto a virtual ACD is also updated to indicate that the selected agent is unavailable.

The list of available agents may be generated by determining if an agent is available to accept a virtual ACD task and determining if the agent is either logged off the telephone switch or available to take a call from the telephone switch. If such is the case, the agent may be added to the list of available agents.

Also, if agents are not available which correspond to the characteristics associated with the task request, computer task requests may be stored in a computer task request queue.

In a particular system embodiment of the present invention, a system for automatically distributing both telephone tasks and computer tasks to agents has an agent application and a telephone switch having an automatic call distribution (ACD) feature for distributing telephone tasks to the agent application. A virtual ACD communicates with the telephone switch, tracks telephone task availability status of the agent application, tracks the computer task availability of the agent application and distributes computer tasks to the agent application based on the telephone task availability of the agent application and the computer task availability of the agent application.

In a particular system embodiment, a computer telephone interface which provides communication between the telephone switch and the virtual ACD. Furthermore, the system may incorporate storage means for storing enterprise specified rules accessible to the virtual ACD. In such a case, the virtual ACD further distributes computer tasks to the agent application based on the enterprise specific rules stored in the storage means.

The system may also include a virtual ACD request queue operably associated with the virtual ACD for storing computer task requests until an application agent is available to handle the requests.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
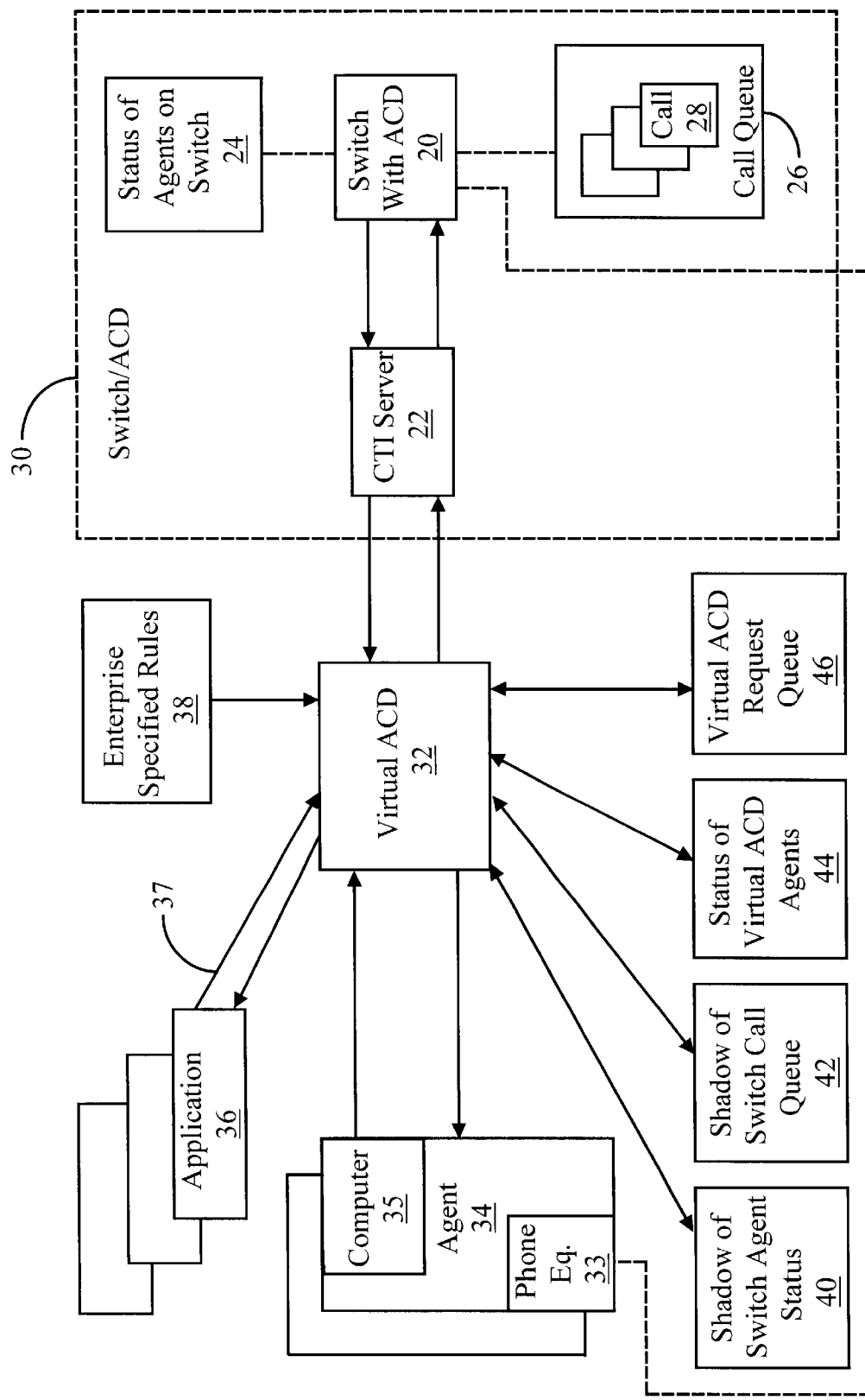
FIG. 1 is a block diagram of one embodiment of the present invention.

A preferred embodiment of the present invention will now be described while referring to the accompanying drawings. FIG. 1 is a block diagram of an automated task distribution system according to the present invention. As seen in FIG. 1, the switch domain 30 includes a conventional telephone switch 20 with automated call distribution (ACD) which communicates with a computer telephone interface (CTI) server 22. The switch 20 routes telephone calls to telephone equipment 33 associated with an agent 34 logged onto the switch 20 utilizing the automatic call distribution system of the switch 20. The switch 20 maintains the status 24 of agents 34 logged onto the switch 20 and also maintains a call queue 26 which includes calls 28 which have yet to be routed to the telephone equipment 33 of an agent 34 logged onto the switch 20.

The CTI server 22 communicates with the virtual ACD 32. The virtual ACD 32 allows computer applications 35 associated with agents 34 to log onto the virtual ACD 32. The virtual ACD 32 also allows requests 37 from applications 36 and uses enterprise specified rules 38 to assign agents 34 to the application requests 37. In order to select an agent 34 for an application request 37, the virtual ACD 32 communicates with the CTI server 22 to obtain agent status from the switch 20 and creates a shadow of the agent switch status 40 which maintains information about the agent status 24. The virtual ACD 32 also creates a shadow of the switch call queue 42 which maintains information about the call queue 26. As will be appreciated by those of skill in the art, the shadows 40 and 42 need not mirror the agent switch status and the call queue but need only contain information which may be pertinent to the assignment of tasks, such as the time of the oldest call in a queue and the number of calls in the queue. The virtual ACD 32 also maintains the status of the computer applications 35 associated with agents 34 logged on the virtual ACD 44 and a queue 46 of requests for computer tasks such as application requests 37 to the virtual ACD 32.

By coordinating the virtual ACD 32 which distributes computer tasks (e.g. application requests 37) and the switch 20 which distributes telephone tasks (e.g. telephone calls), agents 34 logged onto both may only be assigned either a computer task (for example resulting from an application request 37) or a telephone task (for example resulting from an incoming call or assignment of a call 28 in the call queue 26) until the respective task is completed. Telephone tasks are tasks related to telephone calls such as answering incoming calls. Computer tasks are tasks which are typically carried out using a computer, such as responding to e-mail, participating in chat sessions, utilizing voice over IP and the like. In other words, computer tasks are those tasks distributed by the virtual ACD 32 and telephone tasks are those tasks distributed by the switch 20.

Figure 2:
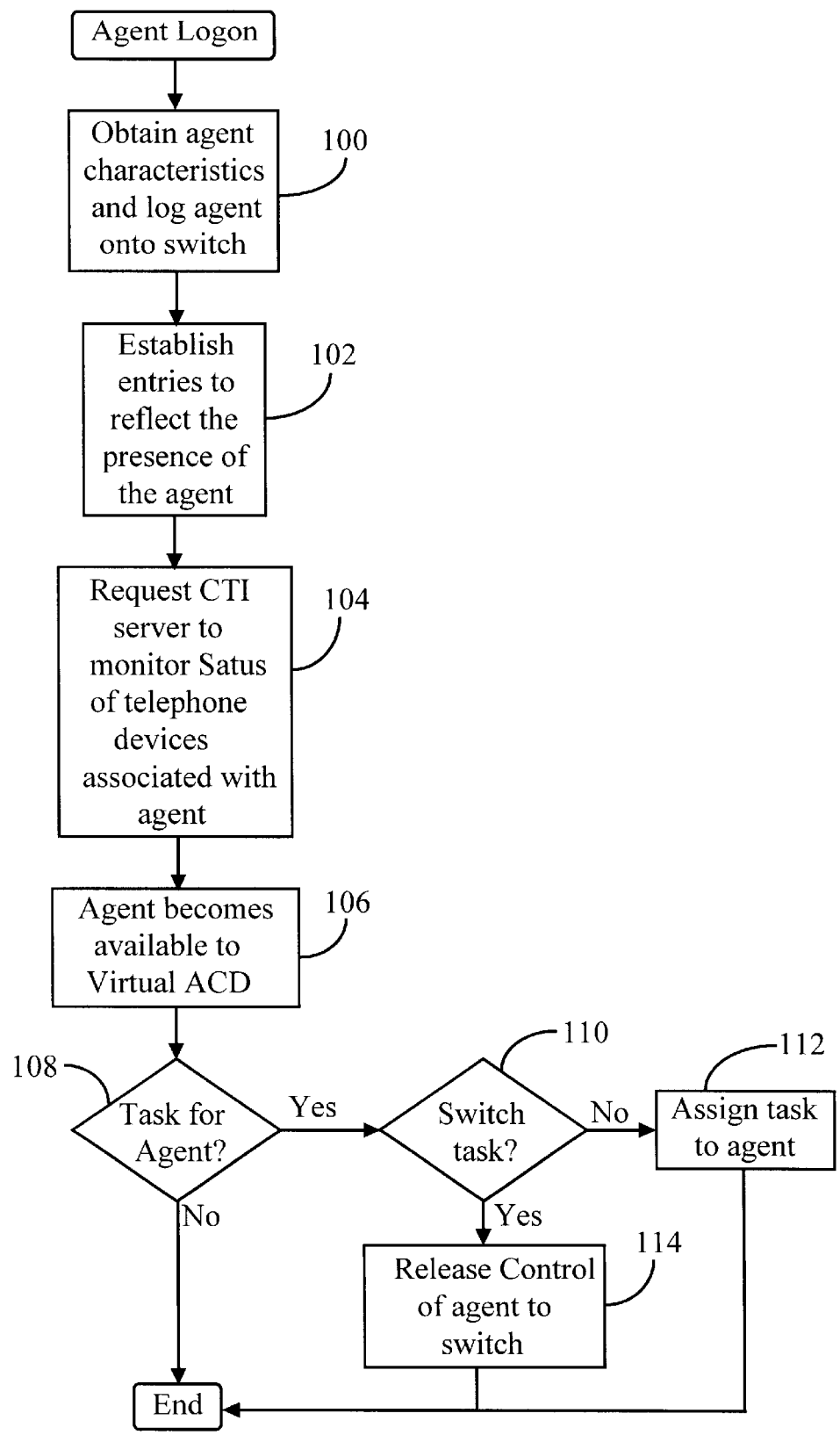
FIG. 2 is a flowchart illustrating operations of the present invention during an agent logon process.
Figure 3:
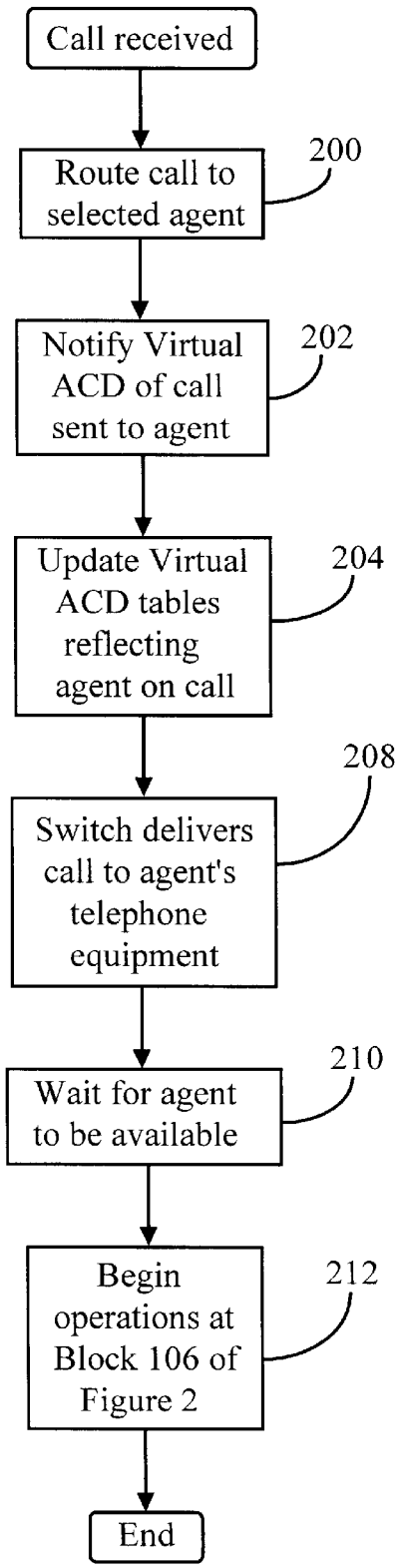
FIG. 3 is a flowchart illustrating operations of the present invention to handle an incoming call.
Figure 4:
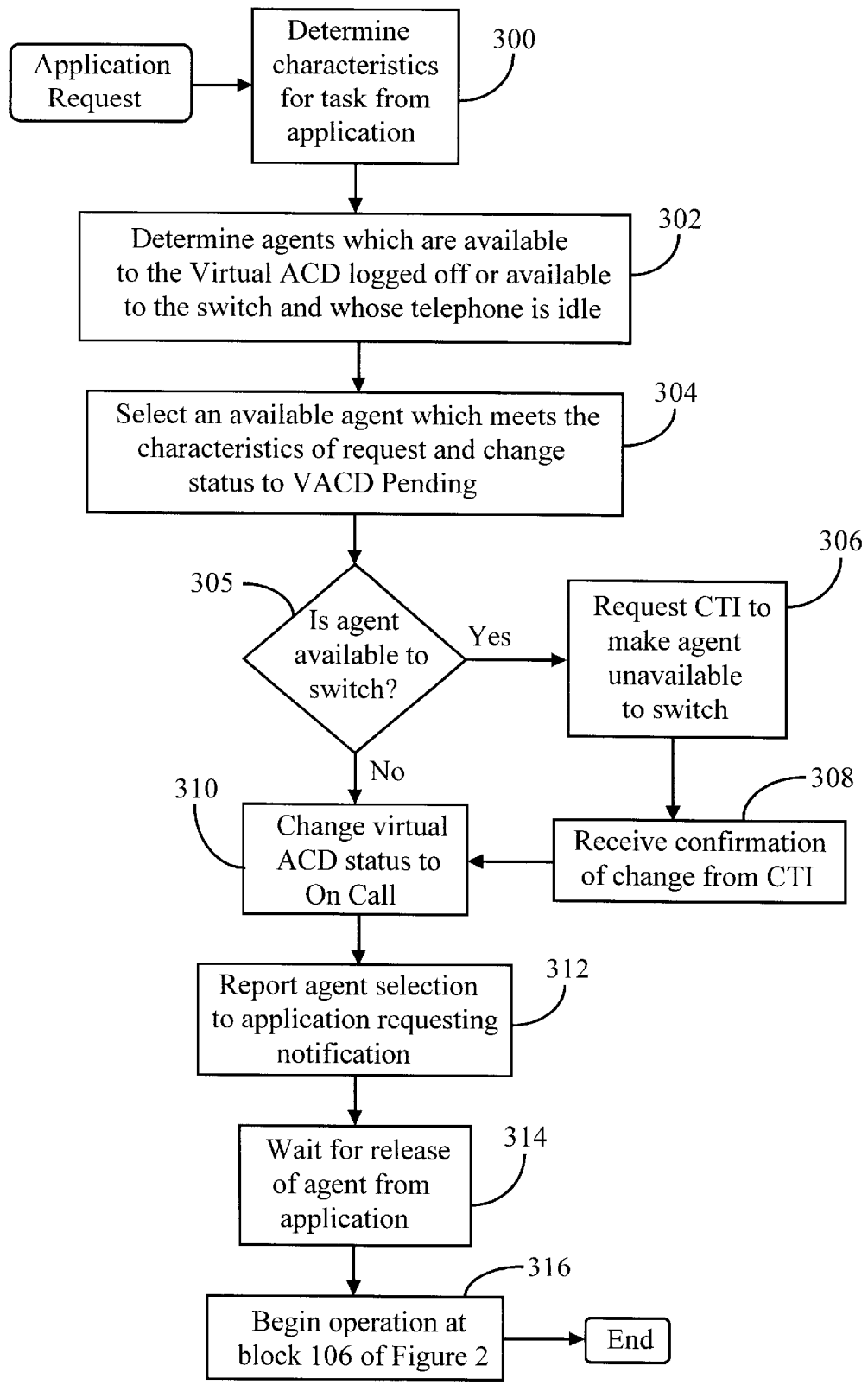
FIG. 4 is a flowchart illustrating operations of the present invention in response to an application requesting an agent.

Operations for various aspects of one embodiment of the present invention are illustrated in detail in FIGS. 2 through 4 which are flowchart illustrations. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 2 illustrates operations according to the present invention when a computer application 35 associated with an agent 34 logs on to the virtual ACD 32. As seen in FIG. 2, the logon process begins when the virtual ACD 32 obtains the characteristics of the agent logging on and logs the agent onto the switch 20 if the agent is capable of handling telephone tasks (block 100). Alternatively, the agent 34 can log on to the switch using the telephone equipment 33. The switch 20 then notifies the virtual ACD 32 of the log on event. The characteristics of the agent 34 may be received from the agent at logon or may be in advance stored by the virtual ACD 32 and then accessed at logon and associated with the agent logging on. Examples of the agent characteristics may be the telephone devices associated with the agent, the agent's skill level or type of skill, the TCP/IP address of the current computer associated with the computer application 35 (the agent's workstation), the e-mail address of the agent or other such characteristics as allow the virtual ACD 32 to automatically assign tasks to the agent 34.

After obtaining the agent characteristics and logging the agent onto the switch 20, entries are established in the status areas to reflect the presence of the agent (block 102). Thus, for example, the status of the agent will be placed in the virtual ACD agent status area 24. Similarly, when the CTI server 22 reports to the virtual ACD 32 that the agent has logged on to the switch 20 the agent status will be placed in the shadow of agent switch status 40. The virtual ACD 32 then requests that the CTI server 22 monitor the status of the telephone devices associated with the agent so that the status of the agent on the switch 20 may be maintained (block 104).

The agent then becomes available to the virtual ACD 32 to assign computer tasks to the agent 34 (block 106). If there is a task to be assigned to the agent 34 (block 108) then it is determined if the task is a telephone task (i.e. a telephone call) (block 110) and if so control of the agent is released to the switch 20 to assign the task (block 114). If the task is not a telephone task then the task is a computer task and the virtual ACD 32 assigns the task to the agent 34 (block 112). After release of the agent 34 to the switch 20 or after assignment of the computer task or if no task is waiting in either the shadow of the switch call queue 42 or the virtual ACD request queue 46, then the logon process is completed. Thus, the shadow of agent switch status 40 and the status of the virtual ACD agents 44 would be updated to reflect the availability of the agent 34. The virtual ACD 32 and the switch 20 are then ready to assign the next task.

FIG. 3 illustrates operations of the present invention when a call is received by the switch 20. When a call is received by the switch 20 it utilizes its ACD process to select an available agent 34 for the call and the call is routed to the agent (block 200). If no agent is available, the call is stored in the call queue 26 until an agent is available. The procedures in handling calls (i.e. telephone tasks) may be the same for handling calls in the call queue 26. The virtual ACD 32 is notified by the CTI server 22 of the call being sent to the agent and thus making the agent unavailable for another ACD task (block 202). The virtual ACD 32 then updates its status areas to reflect the unavailability of the agent (block 204). Thus, the shadow of agent switch status 40, the shadow of the switch call queue 42 and the status of the virtual ACD agents 44 are updated in light of the call being assigned to an agent.

The switch 20 then delivers the telephone task to the telephone equipment 33 associated with the agent 34 (block 208). Then the virtual ACD 32 and the switch 20 wait for the agent 34 to be available (block 210). Typically, the agent 34 will become available either when the agent 34 sends a message to the switch indicating that the agent is available such as dialing a code on the telephone equipment 33 associated with the agent 34 or when the agent hangs up the phone. Preferably, according to the present invention the agent signals availability directly to the virtual ACD 32. By the agent signaling availability directly it reduces the likelihood that the switch 20 will take immediate control of the agent 34 and, hence, starve the virtual ACD 32 of opportunities to assign tasks to agents. Otherwise, the switch 20 may assign a task to an agent 34 before the virtual ACD 32 is aware that an agent is available. However, the present invention may be utilized with the immediate notification system (i.e. the agent is available to the switch immediately upon termination of an existing call) if the starvation issue is taken into account.

After the agent becomes available, the virtual ACD status areas are updated to reflect this availability and operation then begins at block 106 of FIG. 2 (block 212). Thus, the shadow of agent switch status 40 and the status of virtual ACD agents 44 would be updated to reflect the availability of the agent. The virtual ACD 32 and switch 20 are then ready to assign the next task.

FIG. 4 illustrates operations of the present invention when an application request is distributed. As seen in FIG. 4, when an application request is received, from, for example, application 36, the virtual ACD 32 determines the characteristics associated with the task of the application request (block 300). The virtual ACD 32 then determines which agents are available to handle the request (block 302). This determination may be made by accessing the status of virtual ACD agents 44 and the shadow of agent switch status 40 and determining which agents are available to the virtual ACD 32, logged off or available to the switch 20 and whose telephone is idle (e.g. the telephone status of the agent's telephone equipment indicates that the agent is not on the telephone). The virtual ACD 32 then uses this list of available agents to select an agent based on the enterprise specified rules 38 (e.g. current service level in ACD queues and the current number of signed on agents) and the characteristics of the agent which correspond to the characteristics associated with the request (block 304). If the shadow of agent switch status 40 of the agent 34 indicates that the agent 34 is available to the switch 20 (block 305) then the virtual ACD 32 requests the CTI server 22 to make the agent unavailable at the switch 20 (block 306). When confirmation is received from the CTI server 22 that the change in status is complete (block 308) the virtual ACD 32 makes the agent On VACD Task in the status of virtual ACD agents 44 (block 310). The virtual ACD 32 may also update the shadow of agent switch status 40. If the shadow of agent switch status 40 indicates that the agent 34 is unavailable, then the operations of block 306 and 308 need not be carried out.

The virtual ACD 32 then reports the agent selection to the application requesting the agent 32 and the computer application 35 associated with the agent (block 312). This report of the agent may take many forms depending on the type of request. For example, in an e-mail task the report may be providing the agents e-mail address. In a voice over TCP/IP the report may be providing the application with the IP address of the agent. Information corresponding to the computer task may be made available to the computer application 35 associated with the agent 34 in addition to information about the assigned agent. This information can be used to trigger a "screen pop" or similar action on the agent workstation. As will be appreciated by those of skill in the art, any number of reporting methods may be used depending on the type of task request. After reporting the agent to the requesting application, the virtual ACD 32 waits for the release of the agent from the application (block 314) and makes the agent available by informing the CTI server 22 of the change in status and updating the status areas to reflect the availability of the agent and operation then begins at block 106 of FIG. 2 (block 316).

While the present invention has been described with respect to incoming calls and incoming task requests, as will be appreciated by those of skill in the art in light of the present disclosure, these same operations may be equally applicable to distributing tasks from the call queue 26 or the virtual ACD request queue 46. Any number of priority schemes may be utilized in determining the order that calls or requests are selected from the queues. Thus, a priority may be assigned to each call or request and then handled in priority order. Alternatively, an oldest first priority system may be utilized. As will be appreciated by those of skill in the art other priority systems may be utilized while still obtaining the benefits of the present invention.

The status of the agents with respect to the virtual ACD 32 and the switch 20 preferably includes several different status states. For example, with respect to virtual ACD status, the agent may have one of the status states in Table 1.

TABLE 1

Virtual ACD Agent Status

| Status | Description |
| --- | --- |
| Logged Off | Agent Unavailable to the virtual ACD |
| Available | Available to accept tasks |
| Unavailable | Logged onto the virtual ACD but unavailable to accept non-switch related tasks and not actively engaged in any tasks |
| On VACD Task | Currently engaged on a task assigned by the virtual ACD |
| VACD Task Pending | Agent has been selected for a task and is in the process of being made unavailable to the switch |

These states would be used as described above to describe an agent's status. Thus, the agent would be placed in the On VACD Task state when the virtual ACD 32 had notified an application 36 of the agent 34 assigned to a request. The agent would be placed in the VACD Task Pending state while the virtual ACD 32 waited for a response from the CTI server 22 that the agent status was changed at the switch 20. Similarly, the agent status would be set to Available when the agent completed a task and notified the virtual ACD 32 that it was available to accept new tasks. The status of agents with respect to the switch 20 is preferably set to one of the status states in Table 2.

TABLE 2

"Switch Status" or "ACD Telephone Status" States for an Agent

| Status | Description |
| --- | --- |
| Logged Off | Agent is Unavailable to the switch |
| Available | Available to take tasks assigned by the ACD |
| Unavailable | Unavailable to take ACD tasks |
| On Call | Currently using the telephone equipment associated with the agent. This could be an ACD telephone call or a direct call (i.e. a non-ACD call) |

As will be appreciated by those of skill in the art in light of the description herein, these states may be set by the switch 20 with respect to an agent in response to switch activity or in response to virtual ACD activity. Thus, as described above, these states may be set by the virtual ACD 32 requesting the CTI server 22 to have the switch 20 set the agent status to one of these states. Preferably, these states are set as described above with respect to FIGS. 2 through 4.

As used herein, the phrases "switch status" and "ACD telephone status" are used synonymously. Furthermore, the phrase "telephone status" refers to the state of the agent's telephone equipment (e.g. off-hook, etc.).

The present invention has described status areas maintained by the virtual ACD 32 and switch 20. These status areas may be maintained in any number of storage devices such as random access memory (RAM), or other such memory devices. The status areas may be stored in any form of storage including cache, memory, or file storage such as diskette or hard disk. Furthermore, the status areas may be maintained in a single memory or multiple memories.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for distributing tasks associated with a telephone system and tasks associated with a computer system between a plurality of agents, the method comprising:

maintaining a list of the ACD telephone status of at least one agent of the plurality of agents which is logged onto a telephone switch with automatic call distribution (ACD), wherein the list of telephone status of the agent corresponds to the status of the agent with respect to the telephone switch, and maintaining a copy of a call queue associated with the telephone switch;

maintaining a list of the computer status of at least one agent of the plurality of agents which is logged onto a virtual ACD, wherein the list of computer status of the agent corresponds to whether the agent is currently assigned to a computer task, and maintaining a copy of a computer task request queue associated with the virtual ACD;

receiving a computer task request having associated with it characteristics for an agent to be assigned the requested computer task;

generating a list of available agents from the plurality of agents;

determining if an agent of the plurality of agents is available to accept a computer task;

determining if the agent of the plurality of agents is at least one of logged off the telephone switch and available to take a call from the telephone switch;

adding the agent of the plurality of agents to the list of available agents if the agent is available to accept a virtual ACD task and is at least one of logged off the telephone switch and available to take a call from the telephone switch;

selecting an agent from the list of available agents having agent characteristics corresponding to the characteristics associated with the received request; and assigning the received computer task request to the selected agent.

2. A system for distributing tasks associated with a telephone system and tasks associated with a computer system between a plurality of agents, comprising:

means for maintaining a list of the ACD telephone status of at least one agent of the plurality of agents which is logged onto a telephone switch with automatic call distribution (ACD), wherein the list of ACD telephone status of the agent corresponds to the status of the agent with respect to the telephone switch;

means for maintaining a copy of a call queue associated with the telephone switch;

means for receiving a request for a computer task, wherein the computer task comprises a task other than PSTN or IP Telephony communications;

means for receiving a computer task request, wherein the computer task request has associated with it characteristics of an agent to be assigned the requested computer task;

means for determining if an agent of the plurality of agents is available to accept a computer task;

means for determining if the agent of the plurality of agents is at least one of logged off the telephone switch and available to take a call from the telephone switch; and means for adding the agent of the plurality of agents to the list of available agents if the agent is available to accept a virtual ACD task and is at least one of logged off the telephone switch and available to take a call from the telephone switch;

means for selecting an agent from the list of available agents having agent characteristics corresponding to the characteristics associated with the received request; and means for assigning the received computer task request to the selected agent.

3. A computer program product for distributing tasks associated with a telephone system and tasks associated with a computer system between a plurality of agents, comprising:

a computer readable storage medium having computer readable program code means embodied in said medium, said computer-readable program code means comprising:

computer readable program code means for maintaining a list of the ACD telephone status of at lease one agent of the plurality of agents which is logged onto a telephone switch with automatic call distribution (ACD), wherein the list of ACD telephone status of the agent corresponds to the status of the agent with respect to the telephone switch; and computer readable program code means for maintaining a copy of a call queue associated with the telephone switch;

computer readable program code means for maintaining a list of the computer status of at least one agent of the plurality of agents which is logged onto a virtual ACD, wherein the list of computer status of the agent corresponds to whether the agent is currently assigned to a computer task;

computer readable program code means for maintaining a copy of a computer task request queue associated with the virtual ACID;

computer readable program code means for receiving a computer task request, wherein the computer task request has associated with it characteristics of an agent to be assigned the requested computer task;

computer readable program code means for determining if an agent of the plurality of agents is available to accept a computer task;

computer readable program code means for determining if the agent of the plurality of agents is at least one of logged off the telephone switch and available to take a call from the telephone switch; and computer readable program code means for adding the agent of the plurality of agents to a list of available agents if the agent is available to accept a virtual ACID task and is at least one of logged off the telephone switch and available to take a call from the telephone switch;

computer readable program code means for selecting an agent from the list of available agents having agent characteristics corresponding to the characteristics associated with the received request; and computer readable program code means for assigning the received computer task request to the selected agent.

* * * * *